United States Patent [19]

Ohtomo et al.

[11] Patent Number: 5,075,878
[45] Date of Patent: Dec. 24, 1991

[54] HIGH RESOLUTION MEASURING DEVICE FOR TIME DIFFERENCE

[75] Inventors: Fumio Ohtomo; Masahiro Ohishi, both of Tokyo, Japan

[73] Assignee: Kabushiki Kaisha Topcon, Tokyo, Japan

[21] Appl. No.: 687,198

[22] Filed: Apr. 18, 1991

Related U.S. Application Data

[63] Continuation of Ser. No. 372,609, Jun. 28, 1989, abandoned.

[30] Foreign Application Priority Data

Jun. 29, 1988 [JP] Japan ................. 63-161893

[51] Int. Cl.⁵ .................. G01C 3/08; G01S 13/08
[52] U.S. Cl. ................. 364/569; 328/129.1; 342/127; 356/5; 364/561
[58] Field of Search ............ 364/550, 551.01, 561, 364/569, 167.01, 182; 356/4, 5, 358, 400; 328/109, 133, 129.1; 307/234; 342/125, 127; 250/206.1, 231.16, 231.18, 560

[56] References Cited

U.S. PATENT DOCUMENTS

| | | | |
|---|---|---|---|
| 4,053,888 | 10/1977 | Robin et al .................. | 364/569 X |
| 4,413,904 | 11/1983 | Hamada et al. ................ | 356/5 |
| 4,455,556 | 6/1984 | Koshio et al. ................. | 364/561 X |
| 4,531,833 | 7/1985 | Ohtomo ...................... | 356/5 |
| 4,560,271 | 12/1985 | Fumio ........................ | 356/5 |
| 4,715,706 | 12/1987 | Wang ......................... | 356/5 |
| 4,744,653 | 5/1988 | Sano et al. .................. | 356/5 |
| 4,818,100 | 4/1989 | Breen ........................ | 356/5 |
| 4,855,585 | 8/1989 | Nonaka ....................... | 250/206.1 X |
| 4,856,893 | 8/1989 | Breen ........................ | 356/5 |
| 4,861,158 | 8/1989 | Breen ........................ | 356/5 |
| 4,861,159 | 8/1989 | Breen ........................ | 356/5 |
| 4,895,441 | 1/1990 | Allen, Jr. .................. | 356/5 |
| 4,908,784 | 3/1990 | Box et al. ................... | 364/569 |

Primary Examiner—Joseph L. Dixon
Attorney, Agent, or Firm—Brumbaugh, Graves, Donohue & Raymond

[57] ABSTRACT

High resolution measuring systems use a continuous series of laser pulses in measuring distance to an object. An approximate time difference between transmitted and reflected pulses is derived. A second, more accurate, time difference is derived through use of a reference signal sampled in correlation to the pulse signal in order to derive a sampled waveform signal having a period which is long relative to the period of the pulse signal. Phase difference measurements of this sampled waveform provide delay time measurements of high accuracy. The high accuracy and approximate time difference signals are combined to determine time difference between measurement pulses with increased resolution. Time difference is converted to precision distance measurments, with greater accuracy available by averaging several measurements. Several embodiments are described.

8 Claims, 6 Drawing Sheets

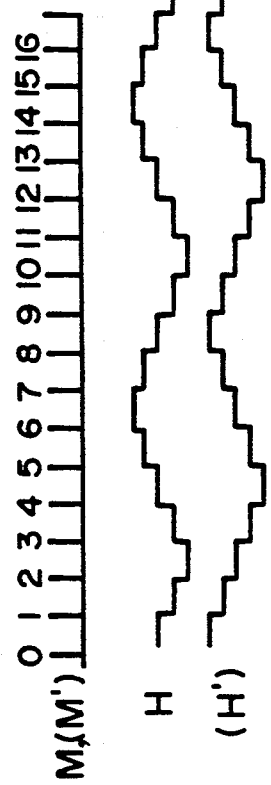
FIG.1(a)
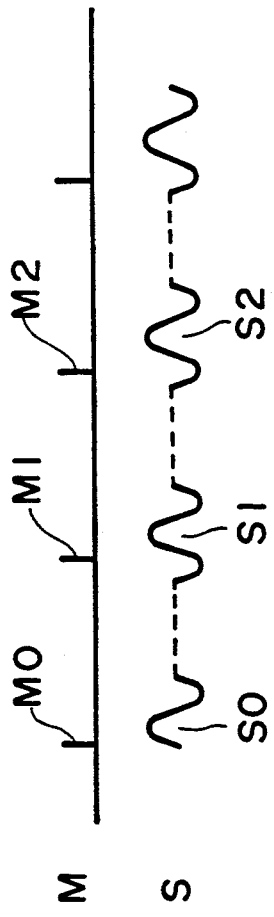
FIG.1(b)
FIG.1(c)
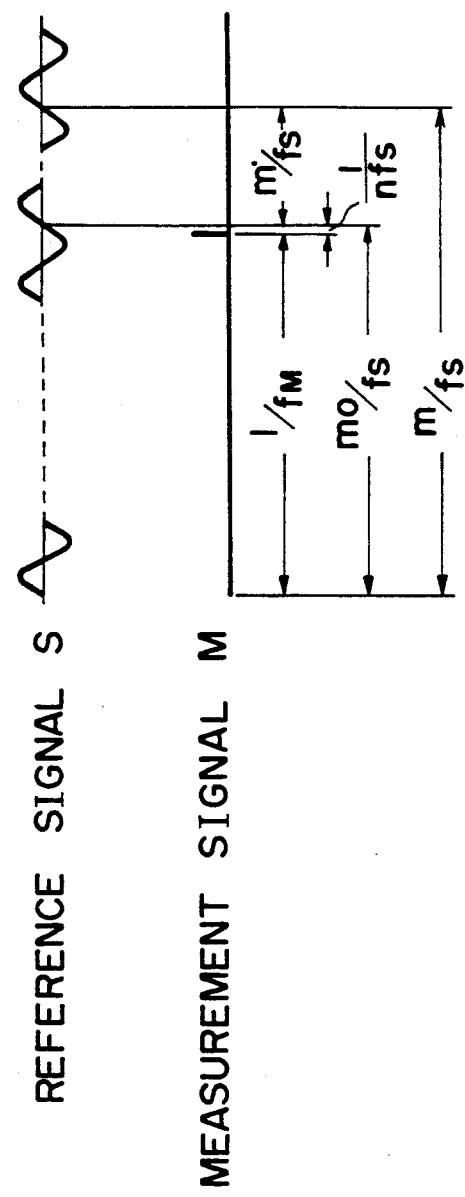
FIG.2

HIGH RESOLUTION MEASURING DEVICE FOR TIME DIFFERENCE

This application is a continuation of application Ser. No. 07/372,609, filed on June 28, 1989, now abandoned.

BACKGROUND OF THE INVENTION

This invention relates to a high resolution measurement of an interval of time, and more particularly to a high resolution measuring device for a time difference suitable for use with an optical distance measuring device for calculating a distance between a body of the device and an object.

A conventional measuring device for an interval of time measures an interval of time between a starting signal and a stopping signal by counting clock signals of a reference signal of a very high frequency compared with such signals. With the measuring device for an interval of time of such conventional type, if the frequency of the reference signal is raised, then a measurement of time of a high resolution is enabled, but there exists a limitation to the frequency of the reference signal due to restrictions of electric parts and restrictions on circuit construction. Thus, the interval of time between the starting signal and the stopping signal is measured by a plurality of times using a reference signal which is not synchronized with those signals. In particular, if a plurality of starting signals and stopping signals are examined in a fixed condition as shown in FIG. 10, clock signals for each measurement are displaced from each other by an amount corresponding to an out of synchronism amount. Thus, if N times of measurement are performed while counting clock signals CL1 to CL5 between a starting signal and a stopping signal by means of a counter, then the total number $\Sigma CL$ is equal to a value of a count when a measurement is performed once with clocks of a frequency of N times the frequency of the clock signals CL1 to CL5. Accordingly, this signifies a rise of resolution by N times.

However, a time interval measuring device of the conventional type is required to repeat a measurement by N times in order to raise its resolution by N times. In particular, this signifies that N times a repeat time of a measurement signal are required for a time for measurement, and if it is intended to measure, for example, an interval of time between a starting signal and a stopping signal having a frequency of 1.5 KHz with a resolution of 6,000 times that of the clock signal, then there is a problem that a period of time of $$\frac{6000 * 1}{1.5 \text{ KHz}} = 4 \text{ sec}$$

is required. Further, the timing of a stopping signal is sometimes varied by a noise produced within the measuring device or an external factor such as measuring circumstances, and against such variations, the number of measurements must be increased to perform an averaging processing. With a conventional measuring device, however, there is a problem that an averaging effect cannot be raised sufficiently because of a restriction in time for measurement. Particularly where a conventional time interval measuring device is employed for optical measurement, a stopping signal is produced in response to light reflected from an object, but such stopping signal is sometimes varied by a noise within the device or by a change in refractive index of air. By the way, if it is assumed that the stopping signal is varied by $\Delta t$, the clock signals CL4 and CL5 contribute to such an averaging effect as described above, but the other clock signals CL1 to CL3 do not contribute to the averaging effect. Accordingly, where a stopping signal is being varied, clock signals are divided into those clock signals which contribute to an averaging effect and the other clock signals which do not contribute to an averaging effect, and the clock signals which do not contribute to an averaging effect do not cause any change in $\Sigma CL$. Accordingly, there is a problem that the averaging effect is generally low. Particularly where a pulse laser diode is employed as a light source of an optical distance measuring device, it has a duty ratio of 0.01% or so. Accordingly, there is a problem that an adequate averaging effect cannot be anticipated.

BRIEF DESCRIPTION OF THE DRAWINGS

FIG. 1(a) shows phase changes in reference signal S with successive pulses of measurement signal M;

FIG. 1(b) illustrates effective synchronization once in eight H pulses for the non-synchronized M and S signals; and FIG. 1(c) illustrates derivation of the sampled waveform signal M through sampling of the S signal in correlation with the M signal.

FIG. 2 illustrates frequency and period relationships between the M and S signals.

DESCRIPTION OF THE INVENTION

Figures 3A, 3B, 3C, 3D:
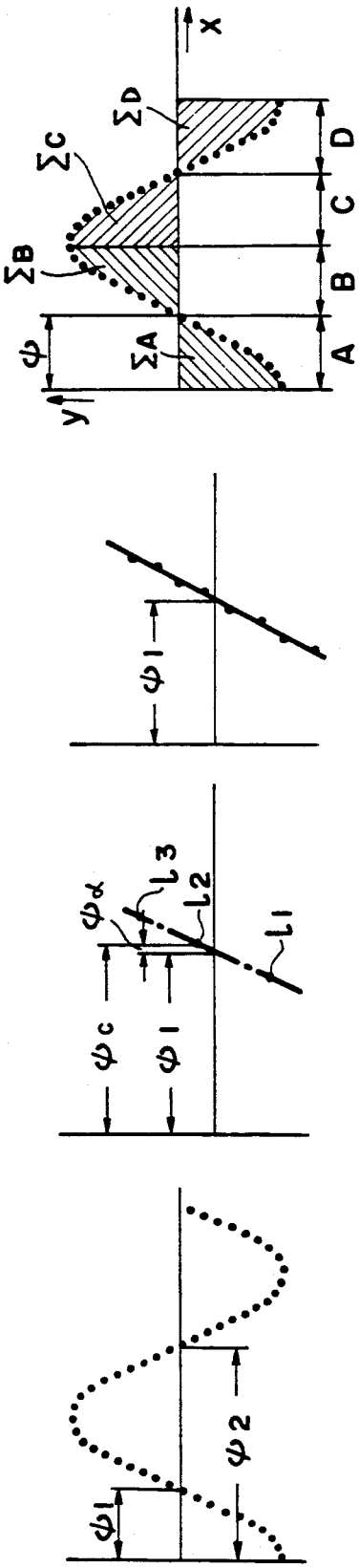
FIG. 3 illustrates a phase difference detecting method based on data processing, FIG. 3(a) showing phase relationships of a sinewave signal, FIG. 3(b) showing an enlarged view near a zero cross point, and FIGS. 3(c) and (d) showing relationships useful in describing zero cross and sine/cosine detection methods, respectfully.

An embodiment of the present invention will be described with reference to the drawings. At first, a principle of a high resolution measurement of a time difference of the present embodiment will be described with reference to FIG. 1. Reference character M denotes a measurement signal and signifies a starting signal (or stopping signal). Reference character S denotes a reference signal, and while in the present embodiment a sine waveform is employed for the reference signal S, any waveform can be employed, provided it is a continuous waveform at each sampling point. The measurement signal M and the reference signal S are displaced a little in synchronism. While the synchronism may be displaced completely, description will given of a construction wherein one of several pulses of the measurement signal M is synchronized with the measurement signal S to be measured in the present embodiment in order to simplify the construction and calculating processing.

The present embodiment is constituted such that the measurement signal M may be synchronized for the eighth time with the measurement signal as shown in FIG. 1(b). Here, a relationship between the measurement signal M and the reference signal S will be described with reference to FIG. 1(a). If the reference signal S when pulses M0, M1, M2, ... of the measurement signal M appear are denoted at S0, S1, S2, ..., respectively, then since the measurement signal M and the reference signal S are differentiated a little in synchronism, the signals S0, S1, S2, ... are a little different in phase from the pulses M0, M1, M2, ... Thus, the reference signal S presents such conditions as shown in FIG. 1(b) when the pulses M0, M1, M2, ... of the measurement signal M appear, and it can be seen that the reference signal S is synchronized once for eight times with the measurement signal M. Further, if the waveform of the reference signal S is sampled with pulses of the measurement signal M, the waveform H which is produced by such sampling presents such a condition as shown in FIG. 1(c). The sampled waveform H has a period of 8 times that of the measurement signal M, and the waveform depends upon the waveform of the reference signal S.

Subsequently, if it is assumed that a pulse of the measurement signal M moves to M' in FIG. 1(b) (in this instance, movement of the reference signal by $\pi/2$), a sampled waveform H' obtained by sampling with the reference signal is such a waveform as shown by H' in FIG. 1(c) As apparent from the waveform H', if pulses of the measurement signal M are moved by $\pi/2$ of the reference signal, the sampled waveform presents a similar change in phase by $\pi/2$. Accordingly, a movement of the time of the measurement signal M changes a phase of the waveform H obtained by sampling of the reference signal S, and the amount of the change in phase corresponds to a value obtained by converting the amount of such movement of the time of the measurement signal M into a phase of the reference signal.

As a result, by measuring a phase change amount $\psi_m$ ($\psi_m = 2\pi u + \psi$, where u is an integer, and $\psi$ is $0 \leq \psi \leq 2\pi$) of a waveform obtained by sampling, a movement amount $t_m$ of the measurement signal M can be calculated from $$t_m = \frac{t_c}{2\pi} \psi_m = t_c \left( u + \frac{\psi}{2\pi} \right) \quad (1)$$

where $t_c$ is a period of the reference signal. Here, in case the change of the measurement signal is continuous, a value of u can be obtained by continuously monitoring a change in phase, but in case the change of the measurement signal is not continuous or when a time difference between 2 signals is to be measured, the value of u cannot be known. Thus, a time difference t as to a portion of the reference signal lower than the period is calculated from $$t = \frac{t_c}{2\pi} \psi \quad (2)$$

but it is necessary to calculate $ut_c$ in accordance with a different measuring method. However, since the measurement of $ut_c$ need not be performed with a high degree of accuracy, it can be measured by a conventional rough measurement. Accordingly, according to the present embodiment, a time difference of a measurement signal can be measured with a high degree of accuracy by composition of a portion of the time difference lower than a period of a reference signal which is obtained from a phase difference of a sampled waveform and $ut_c$ which is measured by a conventional rough measurement.

Subsequently, description of the high resolution measurement principle of the present embodiment relating to a frequency will be given in detail. FIG. 2 illustrates a relationship between the measurement signal M and the reference signal S. Here, the frequency of the measurement signal M is denoted by $f_M$ while the frequency of the reference signal S is denoted by $f_S$, and the frequency $f_M$ of the measurement signal M is set to a value equal to about $1/m_0$ of the frequency $f_S$ of the reference signal S. Then, if it is assumed that the period of the reference signal S be divided into n to perform sampling, the frequency $(1/f_M)$ of the measurement signal M is given by $$\frac{1}{f_M} = \frac{m_0}{f_S} \pm \frac{1}{nf_S} \quad (3)$$

and the frequency of $f_M$ of the measurement signal M is a reciprocal number to the equation above and is represented by $$f_M = \frac{n}{m_0 n \pm 1} f_S \quad (4)$$

It is to be noted that FIG. 2 shows the case when the sign is minus.

In the meantime, while a circuit construction for executing the processing can make the calculation by dividing the frequency $f_S$ of the reference signal into $1/(m_0 n \pm 1)$ and multiplying the result by n, since the frequency $f_S$ of the reference signal is a comparatively high frequency and a divider for executing $m_0 n - 1$ (or $m_0 n + 1$) is required to perform a high speed operation, it is not suitable to perform the calculation as it is. Accordingly, it is necessary to transform the equation into a suitable equation. At first, if the equation (4) above is represented with $m_0 = m \pm m'$, then the following equation $$f_M = \frac{n}{mn \pm (m'n + 1)} f_S \quad (5)$$

is obtained. Then, if m, m' and n which satisfy $m = m'n + 1$ are selected, then the equation (5) is rewritten as $$f_M = \frac{n}{m(n \pm 1)} f_S \quad (6)$$

Accordingly, the divider constitution is divided into an m division and an $n-1$ (or $n+1$) division, and only that one of $1/m$ dividers or $1/(n \pm 1)$ dividers which constitute the first stage is required to perform a high speed operation. For example, only the m division is required to be at a high speed. Then, generally with the m division, it is easy to set the same to a value which is divisible by some value, and the divider can be constituted from further divided dividers. Accordingly, there is an effect that the number of dividers designed for high speed operation can be reduced.

Meanwhile, the frequency $f_L$ of a fundamental wave component of a signal obtained by sampling of the reference signal with the measurement signal M is represented by $$f_L = \frac{f_M}{n} \quad (7)$$

Accordingly, by substituting the equation (6) above into the equation (7), an equation $$f_L = \frac{1}{m(n \pm 1)} f_S \quad (8)$$

is obtained. The equations (6) and (8) above indicate that a divider and an n-fold multiplier are required for construction of a circuit of the present embodiment, and since the divider performs an operation of division by an integer while the multiplier performs an operation of multiplication by an integer, m and n are each required to be an integer. However, in general, m' need not necessarily be an integer. In case m' is an integer, a signal obtained by sampling is outputted in a regular order in the waveform of a reference signal S, but in case m' is not an integer, the order is indefinite. It is to be noted that while the equations (6) and (8) above may have either one of the positive and negative signs, care must be taken of the fact that the change in phase of a signal obtained by sampling may vary reversely depending upon a sign with respect to a change in time of a measurement signal M.

Further, the relationship between the frequency $f_M$ of the measurement signal M and the frequency $f_L$ obtained by sampling is represented from the equation (8) above as $$\frac{f_M}{f_L} = n \quad (9)$$

Accordingly, the measurement signal M and the reference signal S are synchronized with each other once for n times of the measurement signal M. This is because the frequency $f_L$ obtained by sampling is synchronized with both of the frequencies $f_M$ and $f_S$.

Subsequently, a method of measuring a phase difference of a portion of the reference signal S lower than its period will be described. It is to be noted that the reference signal S is described, for example, as a sine wave for convenience of explanation, but it is not limited to a sine wave but may be a chopping wave or the like. In other words, the reference signal S must only be a waveform which is continuous in a section thereof for which sampling is performed.

MEASURING METHOD OF PHASE BASED ON CLOCKS

The measuring method is a method wherein a reference signal S is sampled with pulses of a measurement signal M and a waveform thus obtained is passed through a band pass filter to smooth the same whereafter a phase thereof is counted with clocks. The phase measurement is a method similar to a method employed in a conventional light-wave distance measuring instrument. The resolution of the method depends upon a frequency $f_S$ of the reference signal S, a frequency $f_C$ of the clock signals, and a frequency $f_L$ of a sampled output signal. For example, if the frequency $f_C$ of the clock signal is 1.5 MHz while the frequency $f_S$ of the reference signal S is 15 MHz and m=10,000, m'=303 and n=33 which satisfy m=m'n+1 are selected, then the frequency $f_L$ of a sampled output is represented by $$f_L = \frac{f_S}{m(n-1)} = \frac{15 * 10^6}{10,000 * 32} \approx 47 \text{ Hz}$$

and the resolution is given by $$\frac{f_C}{f_L} = \frac{1.5 * 10^6 * 10^4 * 32}{15 * 10^6} = 32000$$

Accordingly, the resolution of 32,000 times the frequency $f_S$ of the reference signal can be obtained. It is to be noted that the time resolution is given by $$\frac{1}{15 * 10^6 * 32,000} \approx 2 \text{ psec}$$

Further, since the n (=33) sampled values are smoothed by the band pass filter, all of the measurement signals contributes to an averaging effect. Accordingly, if several times of measurements are repeated and results of such measurements are averaged, then an averaging effect higher than that of a conventional measuring device can be exhibited. For example, in case a measurement is performed by 10 times, the measurement time is 0.3 sec or so which is a total of $(1/f_L)*10=0.2$ sec and 0.1 sec required for a processing calculation. As a result, a resolution of 32,000 times the frequency of the reference signal and an averaging effect of 100 to 300 measurements or so can be obtained in a measurement time of 0.3 sec or so.

METHOD BASED ON DATA PROCESSING

The method is a method wherein a reference signal S is sampled with pulses of a measurement signal M and data thus obtained is processed to measure a phase.

(A) Zero Cross Detecting Method

The zero cross detecting method measures a displacement of a coordinate at which a sine wave crosses a zero value in order to detect a phase. As shown in FIG. 3(a), either $\psi_1$ or $\psi_2$ may be measured, or else an average value between $\psi_1$ and $\psi_2$ may be adopted. It is to be noted that the resolution of the method almost depends upon a performance of an analog to digital converter used. For example, if a 12-bit analog to digital converter is employed, then the method has a resolution of about 4,000 level. Accordingly, the phase resolution near the zero cross point is given by $$\sin^{-1} \frac{2}{4,000} \approx \frac{1}{2,000} \text{ (rad)}$$

and the resolution for one period is given by $$\frac{1}{2\pi * 2,000} \approx \frac{1}{12,560}$$

Accordingly, the method has a resolution of 12,560 times the frequency $f_S$ of the reference signal S.

FIG. 3(b) is an enlarged view of a portion near the zero cross point in FIG. 3(a), and upon measurement of $\psi_1$, at first scanning is performed successively beginning with a phase difference equal to 0, and a phase difference $\psi_C$ at which data changes from the negative to the positive is found out. Further, a data $l_2$ at the phase difference $\psi_C$ and another data $l_1$ at a preceding phase difference are interconnected by a straight line, and a difference $\psi_d$ between the phase difference $\psi_C$ and a zero cross point of the straight line is found out. Then, $\psi_d$ is subtracted from $\psi_C$ so that $\psi_1$ can be found out. $\psi_2$ can be measured in a similar manner. In this instance, however, it is necessary to detect a point at which the sign changes from the positive to the negative when scanning of data is to be performed. It is to be noted that, similarly as in FIG. 3(c), the method of least squares may be applied to data near the zero cross point in order to determine a straight line. In this instance, there is an effect that an averaging effect is yielded. Further, it is also effective to perform zero crossing after a smoothing processing for data near the zero cross point is performed to raise an averaging effect.

With the phase detection by the zero cross method having such a construction as described above, if $n=101$ ($m=10,000$, $m'=99$) is employed, then a resolution of 12,560 times or so the frequency $f_S$ of the reference signal S, and an averaging effect of 30 times or so can be anticipated.

(B) Method Based on Detection of Sine and Cosine Components

The method based on sine and cosine components is a method wherein components of sine waves and cosine waves are integrated to measure a phase as shown in FIG. 3(d). A waveform for one period obtained by sampling is divided into four quarters which are individually defined as regions A, B, C and D. Then, integrations of data of the individual regions are represented as $\Sigma_A$, $\Sigma_B$, $\Sigma_C$ and $\Sigma_D$, respectively, and if a phase difference $\psi$ is calculated, it is given by an equation $$\psi = \tan^{-1}\frac{(\Sigma_A + \Sigma_D) - (\Sigma_C + \Sigma_B)}{(\Sigma_A + \Sigma_B) - (\Sigma_C + \Sigma_D)} \qquad (10)$$

The principle will be described. If data obtained by sampling of the reference signal S with pulses of the measurement signal M is denoted by y, generally y is represented by $$y = \alpha + \beta\sin\left(\frac{2\pi}{\eta}x + \psi\right)$$

Here, x denotes a count (xth) of a sampled output while $\alpha$ is a dc level, and $\beta$ is a magnitude. Then, the right-hand side is rewritten as $$\tan^{-1}\frac{\int_{-k}^{k}y\alpha x - \int_{k}^{3k}y\alpha x}{\int_{0}^{1k}y\alpha x - \int_{2k}^{4k}y\alpha x}$$

where $k=n/4$. If the equation is solved, then $$\tan^{-1}\frac{\sin\psi}{\cos\psi} \rightarrow \psi$$

is obtained. Accordingly, a phase $\psi$ can be calculated from an integrated value.

The phase data obtained in this manner is high in averaging effect because all of the data are used in an integrated form therein. Further, since errors in quantization in sampling are averaged, there is an excellent effect that the averaging effect by such integration is very high in resolution. It is to be noted that the phase detecting method wherein components of a sine wave and a cosine wave are integrated has a higher resolution and can attain a higher averaging effect than the zero cross method even where comparison is made between them in the case of $n=101$.

In the phase detecting method based on data processing described above, sampling is performed n times, that is, sampling is made for one cycle of a waveform of a sampled output. If the sampling number is further increased so that sampling may be performed for several periods, the averaging effect can be further raised. In this instance, averaging is performed for n data, and data processing should be performed using the result of such averaging. For example, if data for 10 periods (an average of sampled waveforms for 10 times) is used, then an averaging effect for more than 300 times can be obtained, and the resolution is higher than 10,000 times the frequency of the reference signal S. Further, the sampled frequency $f_L$ then is given by $$f_L = \frac{f_S}{m(n-1)} = \frac{15 * 10^6}{10,000 * 100} = 15 \text{ Hz}$$

from the equation (8) above. Further, the time required for sampling is given by $$\frac{1}{f_L} * 10 = \frac{10}{15} = 0.7 \text{ sec}$$

and the measurement time is about 0.8 sec.

Figure 4:
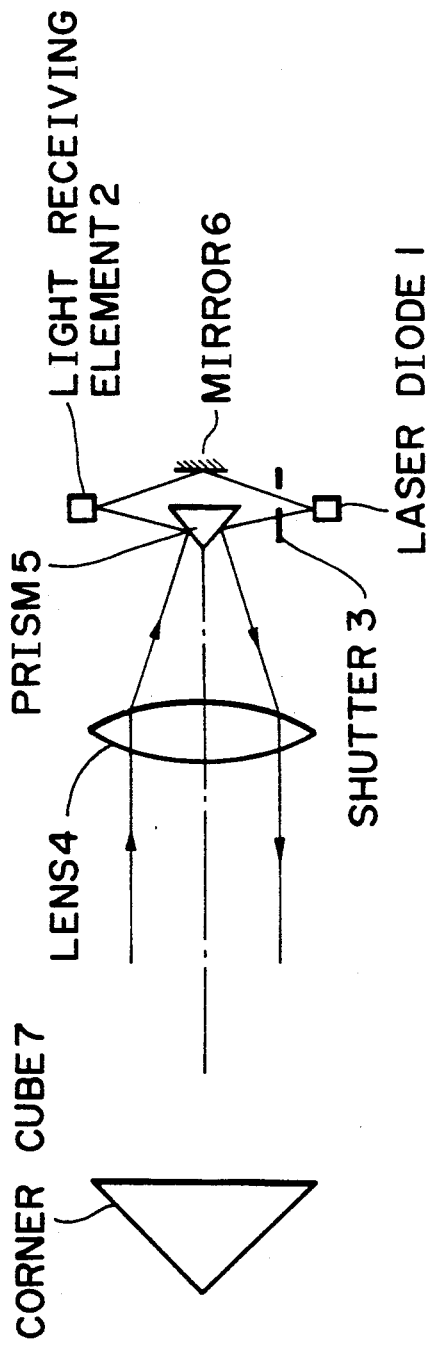
FIG. 4 is a view illustrating light paths of an optical distance measuring device.

Subsequently, an optical distance measuring device to which the high resolution measuring device for a time difference of the present embodiment is applied will be described. FIG. 4 shows an optical system of the optical distance measuring device, and light paths of the optical distance measuring device will be described with reference to the drawing. The optical system is composed of a laser diode 1, a light receiving element 2, a shutter 3, a lens 4, a prism 5 and a mirror 6. A corner cube 7 is an object installed at a location spaced from a body of the optical distance measuring device and has a function to reflect a beam of light.

The laser diode 1 is in the form of a pulse laser diode and has a comparatively high peak power so that it can produce a pulse wave having a duty ratio of 0.01% or so. The light receiving element 2 must only be an element which can receive a beam of pulse light projected from the laser diode 1. The shutter 3 is a change-over device for changing over a light path between a distance measuring light path and an internal light path.

In the optical system having such a construction as described above, a light pulse emitted from the laser diode is projected from the body via the prism 5 and the lens 4 and is reflected by the corner cube 7 placed as an object. The light pulse reflected by the corner cube 7 is introduced into the light receiving element 2 via the lens 4 and the prism 5. These light paths form the distance measuring light path including a distance between the body and the object which makes an object for measurement.

There is another light path by way of which a light pulse emitted from the laser diode 1 is introduced into the light receiving element 2 via the mirror 6. The light path is the internal light path which is formed for the object of removing unstabilizing factors arising in the inside of the body.

Generally, an optical distance measuring device employs a large number of electronic parts, and since a delay time in such electronic parts is readily influenced by a change in temperature or the like, there is the possibility that an unstabilized condition may arise within the body. Thus, by performing measurements for the distance measuring light path and the internal light path and taking a difference between results of such measurements, any unstabilizing factor within the body of the distance measuring device which is included commonly in the two light paths can be removed.

Subsequently, construction of an electric system of the present embodiment will be described with reference to FIGS. 5,6 and 7.

PHASE MEASUREMENT BASED ON COUNTING OF CLOCKS

At first, a measurement of a time difference smaller than a period of a reference signal S (hereinafter referred to as precision measurement) is performed depending upon a phase measurement based on counting of clocks. It is to be noted that, in the present embodiment, u=33, m=10,000 and m'=303 are adopted. A phase measuring device based on counting of clocks is composed of a reference signal generator 100, a pair of band pass filters 110 and 210, a pair of dividers 120 and 130, a synthesizer 140, a pulse detector 170, a pair of counters 180 and 220, a processing calculating section 190, a sample holding circuit 200, and so on. The reference signal generator OSC 100 is a reference signal source and generates a reference signal of 15 MHz. The reference signal is forwarded to the first band pass filter BF 110 so that the latter may output a sine wave of the reference signal. Meanwhile, the first divider DVA divides the frequency of 15 MHz generated by the reference signal generator OSC 100 to 1/10 and outputs a frequency of 1.5 MHz. Further, the second divider DVB 130 divides the frequency of 1.5 MHz to 1/32,000 and outputs a frequency of about 47 Hz. Furthermore, the synthesizer SY 140 multiplies the signal of 47 Hz by 33 and outputs a signal of about 1.547 KHz. Here, the output signals of the first divider DVA 120, second divider DVB 130 and synthesizer SY 140 are in the form of binary digitized signals. Meanwhile, a driver DR 150 drives the laser diode 1 in a pulsed manner in accordance with the output signal of the synthesizer SY 140. Accordingly, the laser diode 1 emits a beam of light in the form of pulses having a period of about 1/1.547 KHz. The thus emitted pulsed light progresses along the distance measuring light path and is introduced into the light receiving element 2 by which it is converted into an electric signal. The electric signal converted by the light receiving element 2 is amplified by an amplifier AM 160 and forwarded to the pulse detector PD 170. The pulse detect PD 170 thus generates a pulse signal which is binary digitized in accordance with the output signal of the amplifier AM 160. Then, using the output signal of the synthesizer SY 140 as a counting starting signal and the output signal of the pulse detector PD 170 as a counting stopping signal, the first counter section CTC 180 measures an interval of time between the starting signal and the stopping signal in accordance with an instruction from the processing calculating section CON 190. It is to be noted that the first counter section CTC 180 employs a frequency of 15 MHz of the reference signal generator OSC 100 as a clock signal. The sample holding circuit SH 200 sample holds the output signal of the first band pass filter BF 110 in accordance with the output signal of the pulse detector PD 170. Accordingly, such a waveform as shown at H in FIG. 1(C) appears on the output side of the sample holding circuit SH 200. (It is to be noted that 33 signals M in FIG. 1(C) make a waveform corresponding to one cycle.)

Then, the second band pass filter BFL 210 is provided to extract a frequency of 47 Hz which is a fundamental wave of the output of the sample holding circuit SH 200, and a sine wave of 47 Hz is outputted from the second band pass filter BFL 210. Meanwhile, a waveform shaper WF 230 binary digitizes a sine wave of the output signal of the second band pass filter BFL 210 into a rectangular wave signal and outputs the rectangular wave signal. Further, using the output signal of the second divider DVB 130 as a counting starting signal and the output signal of the waveform shaper WF 230 as a counting stopping signal, the second counter section CTF 220 measures an interval of time between the starting signal and the stopping signal in accordance with an instruction from the processing controlling section CON 190. It is to be noted that the second counter section CTF employs a frequency of 1.5 MHz of the output signal of the first divider DVA 120 as a clock signal. Meanwhile, the processing calculating section CON 190 synthesizes the measurement signals obtained by the first counter section CTC 180 and the second counter section CTF 220 and forwards data to a display section (not shown).

Here, resolutions of the first counter section CTC 180 and the second counter section CTF 220 will be described. The first counter section CTC 180 has a time resolution of 1/(33*15 MHz), which is 10/33 m if converted into a distance from a relationship to the velocity of light and due to the fact that light reciprocates over the distance to the object. Meanwhile, the second counter section CTF has a time resolution of 32,000 times that when it is resolved with the frequency of the reference signal S as described hereinabove in the description of the principle of measurement (1.5 MHz/47 Hz), and if this is converted into a distance, then it is 10/32,000 m.

In the following, operation of the construction of the electric system of the present invention will be described. At first, the processing calculating section CON 190 changes over the shutter 3 to select the distance measuring light path as an effective light path and delivers a signal to start a measurement to the first counter section CTC 180 and the second counter section CTF 220. The first counter section CTC 180 and the second counter section CTF 220 perform counting operations in accordance with the instruction from the processing calculating section CON 190, and then, after completion of such counting operations, they forward a completion signal to the processing calculating section CON 190. After reception of such counting completion signals, the processing calculating section CON 190 receives count result signal data from the first counter section CTC 180 and the second counter section CTF 220. Further, the processing calculating section 190 converts the count value obtained by the first counter section CTC into a distance value to find out a rough measured value. Meanwhile, the count value obtained by the second counter section CTF 220 is converted similarly into a distance value to find out a precise measured value. Here, the rough measured value is somewhat corrected so that a meter unit of the rough measured value and a meter unit of the precise measured value may coincide with each other to perform a calculation to combine them. In particular, the rough measured value after correction is employed for an upper figure or figures than the meter unit but the precise measured value is employed for a lower figure or figures than the meter unit when they are to be combined with each other.

Such measuring operation is performed by 10 times, and an average value therefrom is adopted as a distance value of the distance measuring light path.

Subsequently, the shutter 3 is changed over to the internal light path side, and similar measurements to those described above are performed to obtain a distance value of the internal light path. Then, the distance value of the internal light path is subtracted from the distance value of the distance measuring light path to obtain a final result, by which an unstabilizing factor within the device can be removed. Accordingly, the final result is forwarded to the display section (not shown) to effect an indication or the like.

PHASE MEASUREMENT BASED ON DATA PROCESSING

Figure 6:
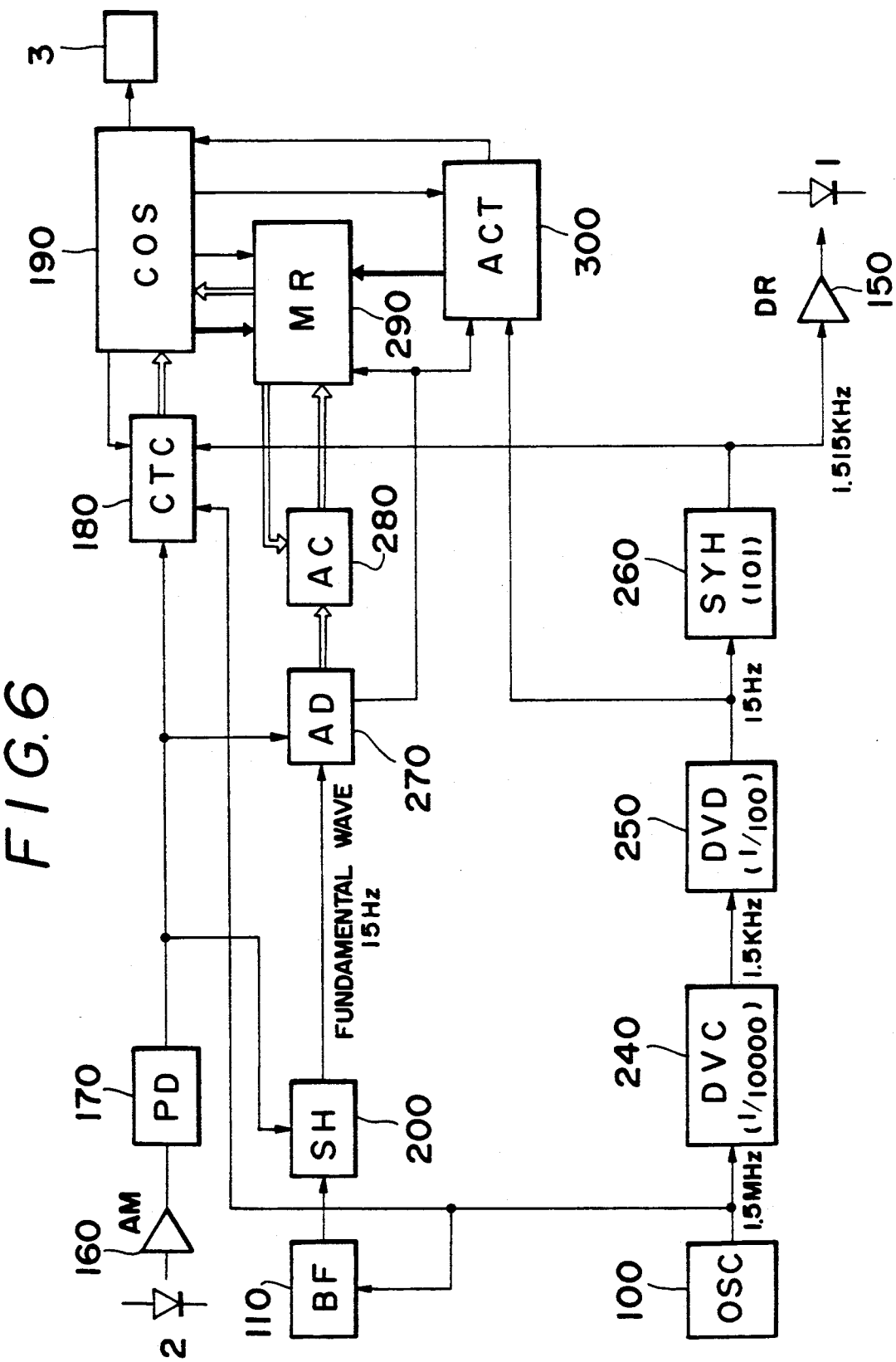
FIG. 6 is a view showing a construction a phase difference detecting device based on zero cross.
Figure 7:
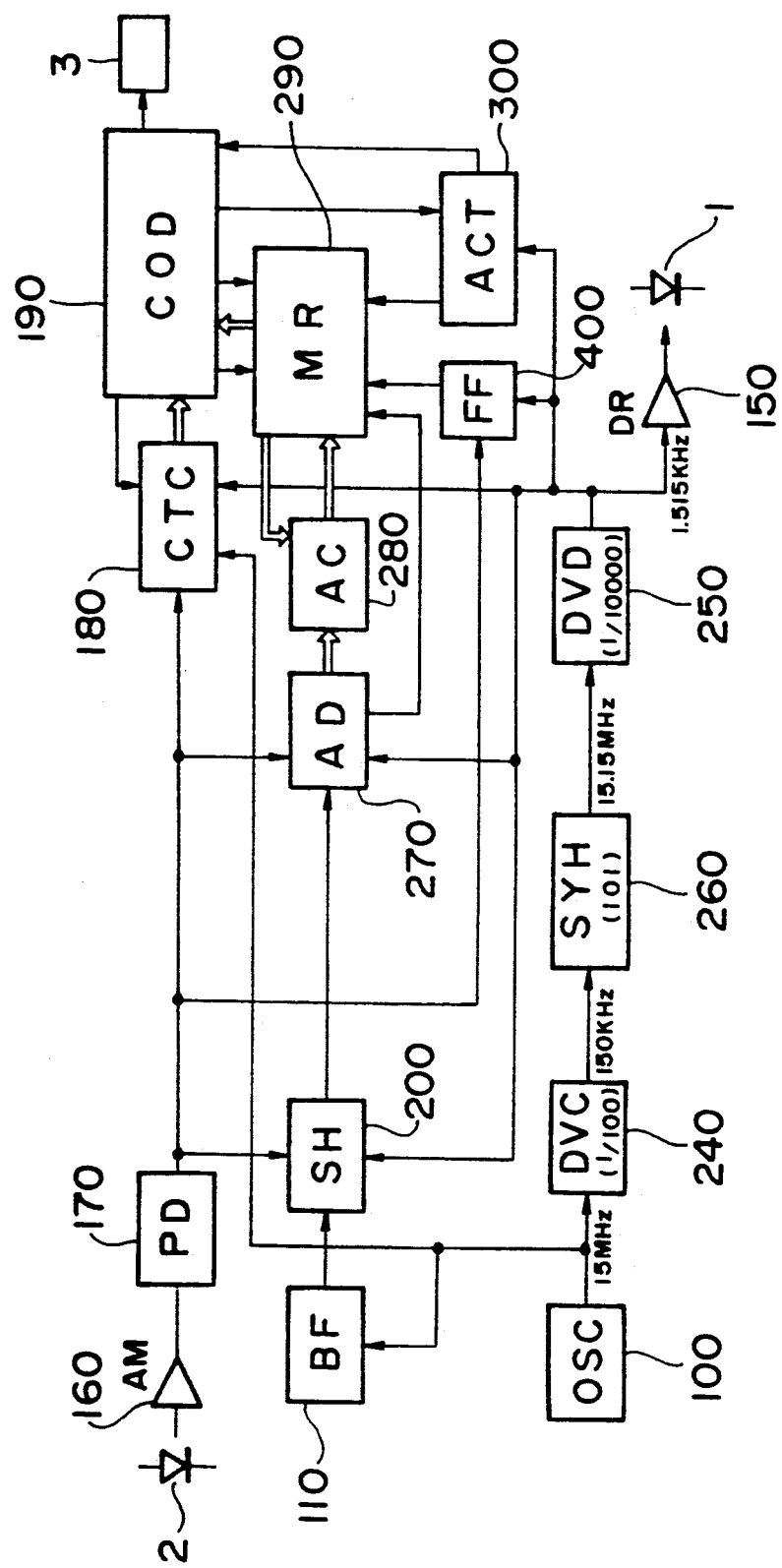
FIGS. 7 and 8 show modification to the phase detecting device based on data processing.

Subsequently, FIG. 6 shows a phase measuring device by which a measurement of a time difference smaller than the period of the reference signal S is performed by a phase measurement based on data processing. It is to be noted that, in the present embodiment, n=101, m=10,000 and m'=99 are employed. The phase measuring device is composed of a reference signal generator 100, a band pass filter 110, a pair of dividers 240 and 250, a synthesizer 260, a pulse detector 170, a counter section 180, a calculating processing section 190, a sample holding circuit 200, an analog to digital converter 270, an adder AC 280, a memory section 290, an address counter 300, and so forth. It is to be noted that signals to be inputted as a counting starting signal and a counting stopping signal to the counter section CTC 180 have a frequency of 1.515 KHz, and the driver DR150, a laser diode 1, a light receiving element 2 and the pulse detector 170 operate similarly with the frequency of 1.515 KHz. A frequency of 15 MHz generated by the reference signal generator OSC 100 is divided to 1/10,000 into 1.5 KHz by the first divider DVC 240 and is further divided to 1/100 by the second divider 250, which thus outputs a signal of 15 Hz. Then, the synthesizer SYH 260 multiplies the frequency of 15 Hz by 101 and outputs a frequency of 1.515 KHz. And, the analog to digital converter AD 270 converts, in accordance with a signal from the pulse detector PD 170, a value when the sample holding circuit SH 200 enters a holding state into a digital value. The sample holding circuit SH 200 samples an output waveform of the band pass filter BF 110 while pulses appear on the output side of the pulse detector PD 170. Then, the adder AC280 adds data from the analog to digital converter AD 270 and data from the memory section MR 290 and forwards a result of such addition to the memory section MR 290. The memory section MR 290 has more than n memories prepared therein, and when a signal of completion of conversion from the analog to digital converter is received, output data of the adder AC 280 is stored into one of the memories which is designated by the address counter ACT 300. The address counter ACT is in the form of an n-ary (101-ary) counter and counts the frequency of 1.515 KHz which is a signal of completion of conversion. Meanwhile, a counting operation of the address counter ACT 300 proceeds such that the address counter ACT 300 starts its counting operation in synchronism with 15 Hz which is an output signal of the second divider 250 after reception of an operation starting signal from the processing controlling section COS 190, and each time a signal of completion of conversion is counted for n (101) times, the address counter ACT 300 forwards a carry signal to the processing calculating section COS 190.

Subsequently, operations of the analog to digital converter AD 270, adder AC 280, memory section MR 290 and address counter ACT 300 will be described. At first, contents of the memory section MR 290 are all reset by the processing calculating section COS 190, and further the address counter ACT 300 has a count equal to 0. In this state, a measurement is started, and after outputting of a signal to the pulse detector PD 170 is completed, the analog to digital converter AD starts its analog to digital conversion. The memory section MR 290 forwards contents (having a value equal to 0 because the memory section MR 290 is in a reset state) of one of the memories thereof designated by the address counter ACT 300 to the adder AC 280. After completion of analog to digital conversion, data is forwarded from the analog to digital converter AD 270 to the adder AC 280, and the adder AC 280 adds the data from the memory section MR 290 and the data from the analog to digital converter AD 270 and forwards the added data to the memory section MR 290. Meanwhile, after completion of analog to digital conversion, the analog to digital converter AD 270 forwards a conversion completion signal to the memory section MR 290 and the address counter ACT 300. In response to the conversion completion signal, the memory section MR executes a writing operation while the address counter ACT executes counting by one. In other words, data of the memory designated by the address counter ACT and output data of the analog to digital converter AD 270 are added, and the memory is rewritten with the thus added data as a new data while the data of the address counter ACT 300 is incremented by +1 to make preparations for rewriting of a memory of the next address. Accordingly, each time data appears at the pulse detector PD 170, the contents of a memory at an address designated by the address counter ACT 300 are rewritten while the address counter ACT 300 is incremented by +1. Further, if the address counter ACT 300 performs counting by n (101) times, the address counter ACT 300 is returned to 0 and forwards to the processing calculating section COS 190 a carry signal indicating that data for one period of the sampled waveform have been taken in. As a result, the memory section MR 290 has data for one period of the sampled waveform stored therein. Meanwhile, during a rewriting operation of a memory, the processing calculating section COS 190 monitors a carry signal produced by the address counter ACT 300, and it continues measurement until a total of 10 carry signals (a number of times for which an average of the sampled waveform is to be taken) are received. As a result, after 10 carry signals are recognized, a sum of data for the 10 periods is stored into the memory section MR 290. It is to be noted that the processing calculating section COS 190 makes similar operations to the processing calculating section of the phase measuring device (FIG. 5) based on a clock signal described hereinabove, but such various operations during sampling as described above and execution of the calculation for a phase difference measurement based on the method of data processing are added to the operations. It is to be noted that, in order to execute data processing for precision measurement, the processing calculating section 190 can designate an address to read contents of the memory section MR 290.

Data read in this manner will be described with reference to FIG. 3(a). The axis of abscissa in FIG. 3(a) indicates an address of a memory, and each of data represents a sum of 10 measured values. Accordingly, an average value can be obtained by dividing such sum by 10. Then, the relationship between an address of a memory and the phase is such that an address of n (101) corresponds to the phase of $2\pi$. Here, a precision measurement of time based on a phase will be described by way of an example of a zero cross detecting method among various measuring methods based on data processing. The memories are scanned successively beginning with that of the address 0 to search for an address at which the data value changes from the negative to the positive. (This corresponds to $\psi_C$ in FIG. 3(b)) Then, making use of a data value of the memory at the address thus searched and another data of another memory at the preceding address, a difference in address (corresponding to $\psi_a$ in FIG. 3(b)) between the zero cross point and the address at which the data changes to the positive is calculated. In particular, an imaginary minute address smaller than 1 address is calculated, and the address difference is subtracted from the address at which the data value changes to the positive to calculate an address of the zero cross. By calculating a product between the address value of the zero cross calculated in this manner and 1/(101*15 MHz), when a distance in precision measurement can be found out. It is to be noted that the time resolution of the counter section CTC 180 here is 1/(101*15 MHz) while the distance resolution is 10/101 m. Then, the processing calculating section COS 190 converts a count value obtained at the counter section CTC 180 into a distance to find out a rough measured value and then converts the address value of the zero cross into a distance to find out a precision measured value, whereafter it combines the rough measured value and the precision measured value to find out a distance of the object. It is to be noted that description of operation of the shutter will be omitted herein because it is the same as in the phase measuring method based on clocks of FIG. 5.

MODIFICATION TO PHASE MEASUREMENT BASED ON DATA PROCESSING

Subsequently, a modification to the phase detecting method based on data processing will be described. In the electric system for data processing shown in FIG. 6 and described hereinabove, the input frequency to the synthesizer SYH 260 is a comparatively low frequency of 15 Hz. Generally, since the synthesizer SYH 260 is composed of a phase locked loop, where the frequency of the input signal is low, much time is required until operation of the same is stabilized. The present embodiment is improved in consideration of the problem, and the second divider DVD 250 and the synthesizer SYH 260 are connected reversely as shown in FIG. 7, and the waveform of a reference signal S (output of the band pass filter BF 110) is also sampled with an output of the second divider DVD 250 so as to obtain a reference sampled waveform.

The memory MR has a number of memories greater than n*2, and the address of the highest order is designated by a flip-flop FF 400. In particular, data of a reference sampled waveform are stored in n memories where the address of the highest order is "0" while data of a sampled waveform of a measurement signal are stored in n memories where the address of the highest order is "1". It is to be noted that the flip-flop FF 400 is connected to receive an output signal of the second divider DVD 250 as a reset signal and an output signal of the pulse detector PD 170 as a set signal.

Subsequently, operation of the present embodiment will be described. A frequency of 15 MHz generated by the reference signal generator OSC 100 is divided to 1/100 by the first divider DVC 240 into a frequency of 150 KHz, which is then multiplied by 101 by the synthesizer SYH 260 into a frequency of 15.15 MHz. The frequency of 15.15 MHz is further divided to 1/10,000 by the second divider DVD 250 into a signal of a frequency of 1.515 KHz. Then, the frequency of 1.515 KHz is delivered to the driver DR 150 and so on so that the laser diode 1 and so on can be driven thereby.

Figure 8:
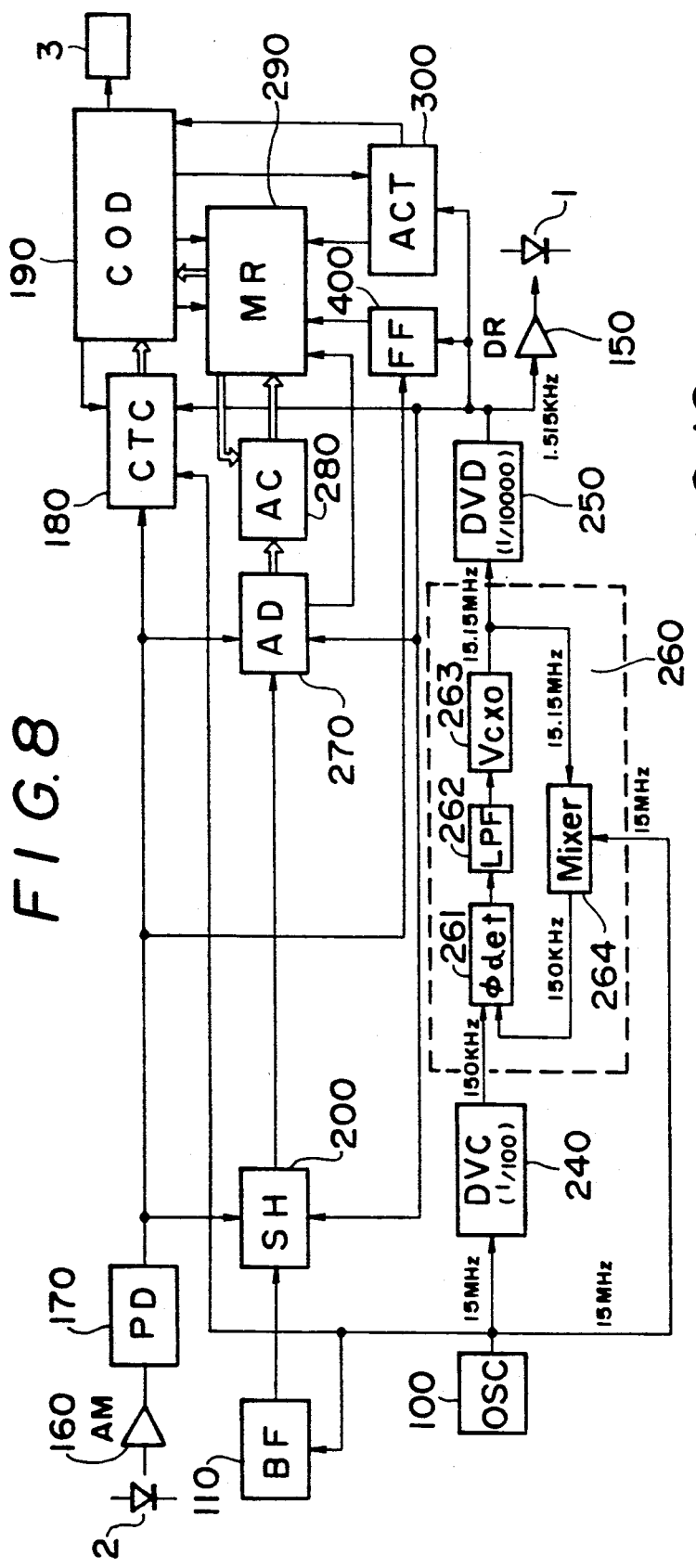
Figure 10:
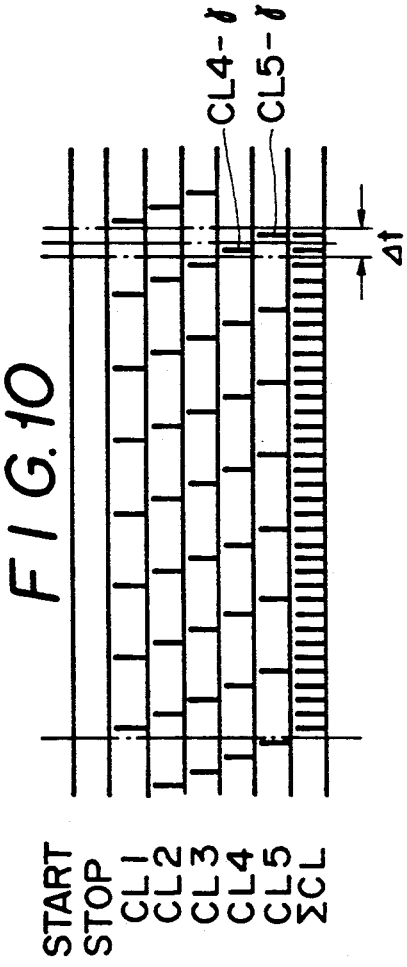
FIG. 10 is a view illustrating a conventional time difference measurement.

Here, construction of the synthesizer SYH 260 will be described in detail with reference to FIG. 8. The synthesizer SYH 260 is composed of a phase comparator 261, a low pass filter LPF 262, a voltage controlled oscillator VCXO 263 and a mixer 264. An output signal of the voltage controlled oscillator VCXO 263 is transmitted to the mixer 264 at which it is mixed with a reference signal from the reference signal generator OSC 100 to detect the same. The mixer 264 may be constituted, for example, from a D-type flip-flop circuit. Thus, an output signal of 15.15 MHz from the voltage controlled oscillator VCXO 263 is received at the data terminal of the flip-flop circuit while a reference signal of 15 MHz from the reference signal generator OSC 100 is received at the clock terminal of the flip-flop circuit. With the flip-flop circuit connected in this manner, a beat signal can be taken out in response to a trigger of the frequency of 15 MHz of the reference signal. Accordingly, the mixer 264 can mix and detect the output signal of 15.15 MHz from the voltage controlled oscillator VCXO 263 and the output signal of 15 MHz from the reference signal generator OSC 100 and take out a signal of 150 KHz corresponding to a frequency of a difference between the frequencies. Further, the frequency of 150 KHz obtained by division by the first divider DVC 240 and the output signal of the mixer 264 are compared in phase with each other by the phase comparator 261, and an output signal of the phase comparator 261 is transmitted to the frequency control terminal of the voltage controlled oscillator VCXO 263 via the low pass filter LPF 262. By the phase locked loop, the output signal of the first divider 240 and the output signal of the mixer 264 can be synchronized with each other.

Figure 9:
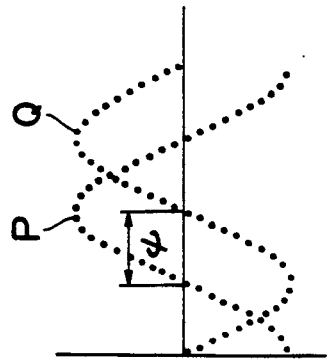
FIG. 9 is a view illustrating data stored in a memory.

When a pulse signal is generated from the second divider DVD 250, the driver DR 150 drives the laser diode 1 to cause the latter to emit light while the address counter ACT 300 is incremented by +1 and the flip-flop FF 400 is reset. Accordingly, a data of that one of the memories where the address of the highest order is "0" and the lower address is designated by the address counter ACT 300 is transferred from the memory section MR 290 to the adder AC 280. Then, a signal of the second divider DVD 250 is forwarded also to the sample holding circuit SH 200 and the analog to digital converter AD 270, and while pulses are produced on the output side of the second divider DVD 250, the sample holding circuit SH 200 remains in its sampling state. Then, after the output of pulses of the second divider DVD 250 comes to an end, the sample holding circuit SH 200 comes into a holding state, and the analog to digital converter AD 270 starts its analog to digital conversion. After completion of such analog to digital conversion, data converted into a digital value by such analog to digital conversion and data of the memory are added by the adder AC 280, and the data of the memory is rewritten with the data of the sum. Soon, light pulses are introduced into the light receiving element so that pulses are produced on the output side of the pulse detector PD. Consequently, the flip-flop FF 400 is reset, and a data at an address wherein the address of the highest order is "1" and the lower address is designated by the address counter ACT 300 is transferred from the memory section MR 290 to the adder AC 280. Then, similarly as upon operation of output pulses of the second divider DVD 250, after output of pulses of the pulse detector PD 170 is completed, contents of the memory MR 290 are rewritten. In this manner, each time a pulse appears at the second divider DVD 250 or the pulse detector PD 170, the highest order which designates an address of the memory section MR 290 is changed over, and as the second divider DVD 250 outputs a pulse, the address counter ACT 300 is incremented by +1. As a result, a waveform sampled with the output of the second divider DVD 250 is stored in the group of those memories of the memory section MR 290 where the address of the highest order is "0" while a waveform sampled with the output of the pulse detector PD 170 is stored in the other group of those memories where the address of the highest order is "1". Accordingly, as shown in FIG. 9, data of the memories where the address of the highest order is "0" are represented as at P while data of the memories where the address of the highest order is "1" are represented as at Q. Accordingly, if the processing controlling section COD 190 calculates a phase difference between P and Q, then a time difference and so on can be measured with a high degree of accuracy. It is to be noted that description of a method of detecting phases of P and Q is omitted herein because the phase measuring method based on data processing described hereinabove may be utilized for the detecting method.

Figure 5:
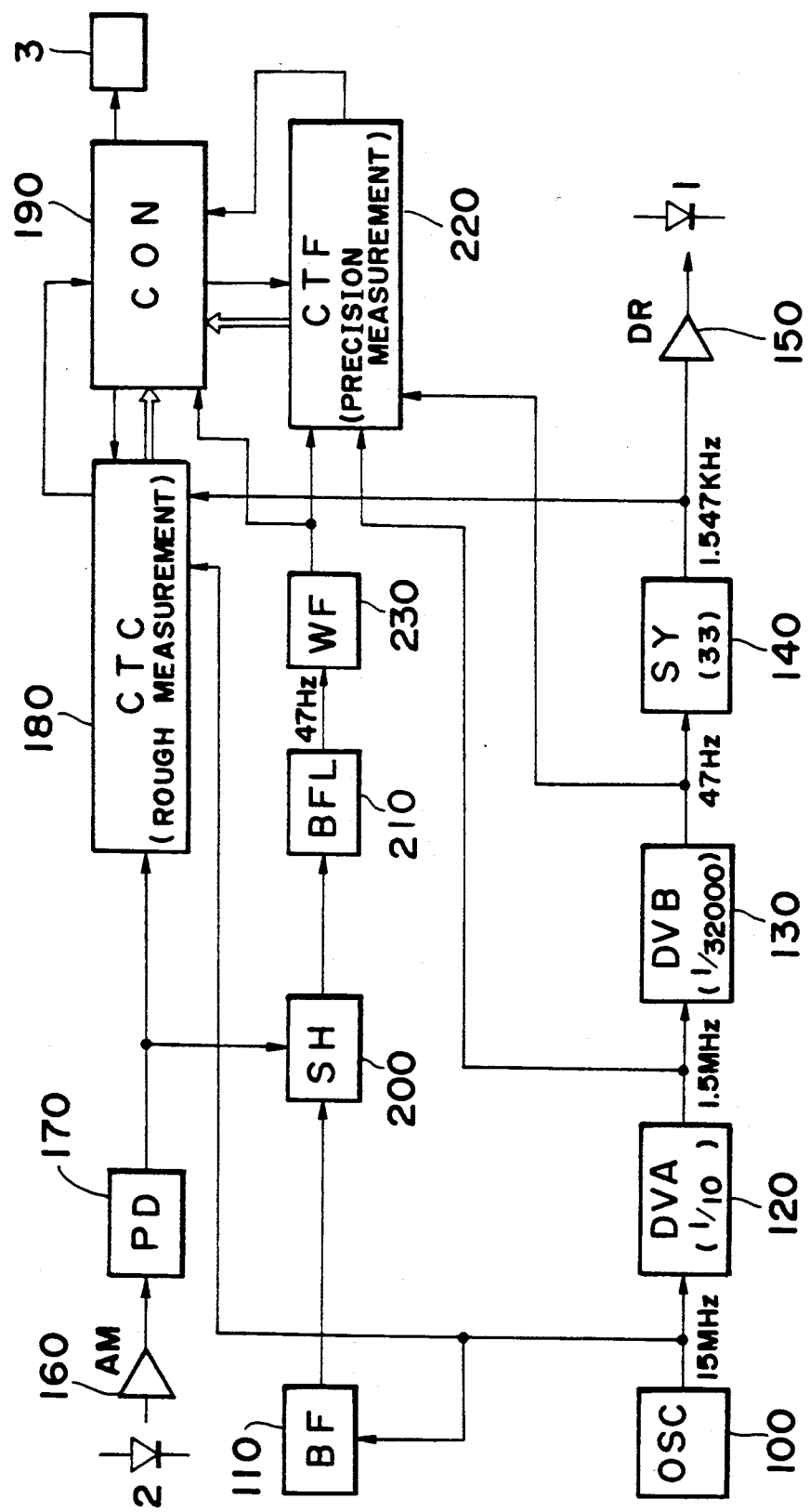
FIG. 5 is a view showing a construction of a phase difference detecting device based on counting of clocks.

While a synthesizer is employed in the phase measuring device having such a construction as described above, the synthesizer SYH 140 in the phase measuring device shown in FIG. 5 is connected to the rear stage side of the second divider DVB 130. Also in the case of the phase measuring device shown in FIG. 6, the synthesizer SYH 260 is similarly connected to the rear stage side of the second divider DVD 250. In particular, while the synthesizer in either of the synthesizers shown in FIGS. 5 and 6 is connected to the divider at the final stage at which the signal presents a low frequency, the synthesizer SYH 260 in the phase measuring device shown in FIG. 7 is interposed between the first divider DVC 240 and the second divider DVD 250. The location at which a synthesizer is connected to two dividers is suitably determined upon designing and is not limited to a special location.

It is to be noted that preferably the processing calculating section 190 is constituted from a microcomputer provided with a memory means. Particularly where it is constituted from a single chip microcomputer, a time difference measuring device of a very small size and weight can be provided. Further, while the present embodiment is described in connection with a measurement of a time difference, it is a matter of course that it can be applied to a measurement of a distance, a velocity or the like making use of the velocity of light.

The present invention has been made in view of such problems as described above, and a high resolution measuring device for measuring a time difference between continuous pulses is characterized in that it comprises an approximate measuring means and a precision measuring means, the approximate measuring means having a construction for measuring a time difference between pulses, the precision measuring means including a reference signal generating means for generating a reference signal S having a different synchronism from a measurement signal M, a sampling means for sampling the reference signal S with pulses of the measurement signal M, and a phase detecting means for detecting a phase difference of a sampled waveform formed by the sampling means, and it further comprises a calculating processing means for converting a phase difference detected by the phase detecting means into a time difference and for calculating a time difference between the pulses from a measured value of the approximate measuring means and another measured value of the precision measuring means.

With the measuring device of the present invention having such a construction as described above, the approximate measuring means measures a time difference between pulses, and the precision measuring means performs a precision measurement of the time difference. The reference signal generating means of the precision measuring means generates a reference signal S having a different synchronism from a measurement signal M, and the sampling means samples the reference signal S with pulses of the measurement signal M. The phase detecting means detects a phase difference of a sampled waveform formed by the sampling means, and the calculating processing means converts the phase difference detected by the phase detecting means into a time difference and calculates a time difference between the pulses from a measured value of the approximate measuring means and another measured value of the precision measuring means.

The present invention having such a construction as described above has a construction wherein it comprises an approximate measuring means and a precision measuring means, and the precision measuring means samples a reference signal S having a different synchronism from a measurement signal M with pulses of the measurement signal M and then a phase difference of a sampled waveform obtained by such sampling is detected by a phase detecting means. Accordingly, there is an effect that a precision measurement of the reference signal lower than a period can be attained. Further, since a time which may make a period unit of the reference signal S is measured by the approximate measurement and the approximate measured value and the measured value by the precision measurement are combined with each other, there is an overall effect that a time difference between pulses can be measured in a high resolution. In other words, since the reference signal S is sampled with pulses of the measurement signal M, this is equivalent to conversion of a sampled waveform to a frequency lower than the reference signal S. If the phase difference of the sampled waveform is measured, then a time difference of the measurement signal M can be calculated. Accordingly, there is an effect that a time difference between pulses can be measured precisely. Further, since an averaging effect can be anticipated over the entire data, a device for measuring a time difference with a very high degree of accuracy can be provided.

What is claimed is:

1. A high resolution measuring device, for measuring time difference between continuous pulses, comprising:

measurement signal means for supplying a measurement signal M having a period and comprising a continuous series of spaced pulses, including a series of reference pulses and a series of delayed pulses;

reference signal means for supplying a periodic waveform reference signal S which is asynchronous with measurement signal M over a plurality of said periods of signal M;

approximate measuring means, responsive to said signal M, for deriving a first approximate time difference between separated pulses of said signal M;

precision measuring means including sampling means, responsive to said signal M and said signal S, for sampling said signal S in correlation with said reference pulses of said signal M for deriving a first sampled waveform signal having a period which is at least twice said period of said signal M and for sampling said signal S in correlation with said delayed pulses of said signal M for deriving a second sampled waveform signal having a period which is at least twice said period of said signal M, and phase detecting means, coupled to said sampling means, for detecting phase differences between said first and second sampled waveform signals; and processing means, coupled to said phase detecting means and said approximate measuring means, for deriving a second time difference based on said phase differences between said first and second sampled waveform signals and for utilizing said second time difference and said first approximate time difference for determining the time difference between pulses with increased resolution.

2. A high resolution measuring device in accordance with claim 1, wherein said reference signal means comprises means for supplying a reference signal S having a period which is smaller than the period of said measurement signal M, whereby said sampled waveform signals derived by said sampling means is a periodic waveform with a relatively long period enabling detection of phase differences with high resolution.

3. A high resolution measuring device in accordance with claim 1, wherein said reference signal means comprises means for supplying a continuous reference signal having a period and synchronism such that effective synchronism between said S and M signals occurs on approximately every eighth M signal pulse, whereby said sampled waveform signal derived by said sampling means is a periodic waveform with a relatively long period enabling detection of phase differences with high resolution.

4. A high resolution measuring device in accordance with claim 1, wherein said processing means is additionally configured for averaging a plurality of such time differences determined from said first and second time differences, so as to further increase resolution.

5. A high resolution measuring device in accordance with claim 1, wherein said measurement signal means and reference signal means respectively comprise means for supplying an M signal and an S signal having a relationship such that the frequency $f_M$ of the M signal and the frequency $f_S$ of the S signal are related as follows:

$$f_M = \frac{n}{m(n \pm 1)} f_S$$

where m is an integer representing the relationship between $f_M$ and the higher frequency $f_S$, and m is an integer representing the relationship between the frequency of said sampled waveform signal and the higher frequency $f_M$.

6. A high resolution measuring device, for measuring the distance to an external object, comprising:

measurement signal means for supplying a measurement signal M having a period and comprising a continuous series of spaced pulses;

means for transmitting, in the form of pulses of light, said measurement signal M over a distance to an external object and for receiving such signal M pulses after reflection from said object;

reference signal means for supplying a periodic waveform reference signal S which is asynchronous with measurement signal M over a plurality of said periods of signal M;

approximate measuring means, responsive to said transmitted and received signals M, for deriving a first approximate time difference between separated pulses of said signals M;

precision measuring means including sampling means, responsive to said signal M and said signal S, for sampling said signal S in correlation with pulses of said transmitted signal M for deriving a first sampled waveform signal having a period which is at least twice said period of said signal M and for sampling said signal S in correlation with pulses of said received signal M for deriving a second sampled waveform signal, having a period which is at least twice said period of said signal M, and phase detecting means, coupled to said sampling means, for detecting phase differences between said first and second sampled waveform signals; and processing means, coupled to said phase detecting means and said approximate measuring means, for deriving a second time difference based on said phase differences between said first and second sampled waveform signals, for utilizing said second time difference and said first approximate time difference for determining the time difference between pulses with increased resolution, and for converting said time difference determinations to precision distance measurements;

whereby the distance to an external object can be measured with a high degree of accuracy.

7. A high resolution measuring device in accordance with claim 6, wherein said reference signal means comprises means for supplying a continuous reference signal having a period and synchronism such that effective synchronism between said S and M signals occurs on approximately every eighth M signal pulse, whereby said sampled waveform signals derived by said sampling means is a periodic waveform with a relatively long period enabling detection of phase differences with high resolution.

8. A high resolution measuring device in accordance with claim 6, wherein said measurement signal means and reference signal means respectively comprise means for supplying an M signal and an S signal having a relationship such that the frequency $f_M$ of the M signal and the frequency $f_S$ of the S signal are related as follows:

$$f_M = \frac{n}{m(n \pm 1)} f_S$$

where m is an integer representing the relationship between $f_M$ and the higher frequency $f_S$, and m is an integer representing the relationship between the frequency of said sampled waveform signal and the higher frequency $f_M$.

* * * * *

UNITED STATES PATENT AND TRADEMARK OFFICE
CERTIFICATE OF CORRECTION

PATENT NO. : 5,075,878
DATED : December 24, 1991
INVENTOR(S) : Ohtomo et al.

It is certified that error appears in the above-identified patent and that said Letters Patent is hereby corrected as shown below:

Column 18, line 11, "m" should read --n--;

Column 20, line 6, "m" should read --n--.

Signed and Sealed this

Twenty-second Day of June, 1993

Attest:

MICHAEL K. KIRK

*Attesting Officer*  *Acting Commissioner of Patents and Trademarks*